United States Patent
Tamstorf et al.

(10) Patent No.: US 10,242,134 B2
(45) Date of Patent: Mar. 26, 2019

(54) ALGEBRAIC MULTIGRID METHOD FOR CLOTH SIMULATION

(71) Applicant: Disney Enterprises, Inc., Burbank, CA (US)

(72) Inventors: Rasmus Tamstorf, Los Angeles, CA (US); Tobias Jones, Santa Monica, CA (US); Stephen McCormick, Lake City, CO (US)

(73) Assignee: DISNEY ENTERPRISES, INC., Burbank, CA (US)

(*) Notice: Subject to any disclaimer, the term of this patent is extended or adjusted under 35 U.S.C. 154(b) by 306 days.

(21) Appl. No.: 15/170,713

(22) Filed: Jun. 1, 2016

(65) Prior Publication Data

US 2017/0351793 A1 Dec. 7, 2017

(51) Int. Cl.
- G06F 7/60 (2006.01)
- G06F 17/10 (2006.01)
- G06F 17/50 (2006.01)

(52) U.S. Cl.
CPC ............... G06F 17/5018 (2013.01)

(58) Field of Classification Search
- CPC .................................................. G06F 17/5018
- USPC ............................................................ 703/2

See application file for complete search history.

(56) References Cited

U.S. PATENT DOCUMENTS

2015/0242546 A1  8/2015  Jeon et al.

OTHER PUBLICATIONS

Ascher et al., "On the modified conjugate gradient method in cloth simulation", The Visual Computer 19, 7-8, 2003, 526-531.

Baker et al., "Multigrid Smoothers for Ultraparallel Computing", SIAM Journal on Scientific Computing 33, 5, 2011, 2864-2887.

Baraff et al., "Large Steps in Cloth Simulation", In Proceedings of the 25th Annual Conference on Computer Graphics and Interactive Techniques, ACM, New York, NY, USA, SIGGRAPH '98, 1998, 43-54.

Bell et al., "Exposing Fine-Grained Parallelism in Algebraic Multigrid Methods", SIAM Journal on Scientific Computing 34, 4, 2012, C123-C152.

Boxerman et al., "Decomposing Cloth", Proceedings of the 2004 ACM SIGGRAPH/Eurographies Symposium on Computer Animation, Eurographics Association, Aire-la-Ville, Switzerland, Switzerland, SCA '04, 2004, 153-161.

Bridson et al., "Robust Treatment of Collisions, Contact and Friction for Cloth Animation", ACM Trans. Graph. 21, 3 (Jul. 2002), 594-603.

(Continued)

*Primary Examiner* — Timothy A Mudrick
(74) *Attorney, Agent, or Firm* — Kilpatrick Townsend & Stockton LLP

(57) ABSTRACT

A method and system for simulation of deformation of a thin-shelled member are disclosed herein. The method includes: receiving at one or more computer systems, information identifying a computer-generated object. The computer-generated object can be a thin-shelled member. The method includes: receiving information identifying a discretization of the computer-generated object, which discretization can be a plurality of nodes; receiving information identifying a set of material properties for the computer-generated object; pre-filtering nodes from the discretization based on predicted collisions; generating a preconditioner via a preconditioning algorithm; and iteratively solving for nodes at a plurality of time points via a conjugate gradient method.

18 Claims, 6 Drawing Sheets

(56) References Cited

OTHER PUBLICATIONS

Briggs et al., "A Multigrid Tutorial Second Edition", Society for Industrial and Applied Mathematics, 2000.

Dalton et al., "Optimizing Sparse Matrix-Matrix Multiplication for the GPU", ACM Transactions on Mathematical Software 41, 4, 2015.

Fish et al., "Unstructured multigrid methods for shells", International Journal for Numerical Methods in Engineering 39, 7, 1996, 1181-1197.

Gee, "Parallel multilevel solution of nonlinear shell structures", Computer Methods in Applied Mechanics and Engineering 194, 21-24, 2005, 2513-2533.

Gee et al., "Nonlinear Algebraic Multigrid for Constrained Solid Mechanics Problems Using Trilinos", Tech. Rep. SAND2006-2256, Sandia National Laboratories, Apr. 2006.

Golub et al., "Chebyshev semi-iterative methods, successive over-relaxation iterative methods, and second order Richardson iterative methods", Numerische Mathematik 3, 1, 1961, 157-168.

Golub et al., "Matrix Computations, 3rd ed", The John Hopkins University Press, 1983.

Harmon et al., "Robust treatment of simultaneous collisions", ACM Trans. Graph. 27, 3 (Aug. 2008), 23:1-23:4.

Hecht et al., "Updated Sparse Cholesky Factors for Corotational Elastodynamics", ACM Transactions on Graphics 31, 5 (Oct.), 123:1-13. Presented at SIGGRAPH 2012, 2012.

Horn et al., "Matrix Analysis", Cambridge University Press. Cambridge Books Online, 1985.

Jeon et al., "Constrainable multigrid for cloth", Computer Graphics Forum 32, 7, 2013, 31-39.

Lee et al., "Multi-resolution cloth simulation", Computer Graphics Form 29, 7, 2010, 2225-2232.

McCormick et al., "Multigrid Methods for Variational Problems: Further Results", SIAM Journal on Numerical Analysis 21, 2, 1984, 255-263.

Míka et al., "Acceleration of convergence of a two-level algebraic algorithm by aggregation in smoothing process", Applications of Mathematics 37, 5, 1992, 343-356.

Narain et al., "Adaptive anisotropic remeshing for cloth simulation", ACM Trans. Graph. 31, 6 (Nov.), 152:1-152:10, 2012.

Oh et al., "A physically faithful multi-grid method for fast cloth simulation", Computer Animation and Virtual Worlds 19, 3-4, 2008, 479-192.

Otaduy et al., "Implicit Contact Handling for Deformable Objects", Computer Graphics Forum 28, 2, 2009, 559-568.

Van Der Vorst, "A Generalized Lanczos Scheme", Mathematics of Computation 39,160 (Oct. 1982), 559-561.

ALGEBRAIC MULTIGRID METHOD FOR CLOTH SIMULATION

BACKGROUND OF THE INVENTION

Multigrid methods are well-known and potentially promise to deliver a solution to a wide variety of discrete equations in a compute time proportional to the number of unknowns. However, new multigrid methods and improvements are desired.

BRIEF SUMMARY OF THE INVENTION

One aspect of the present disclosure relates to an algebraic multigrid method for simulation of deformation of a cloth member. The method includes: receiving at one or more computer systems, information identifying a computer-generated object, which computer-generated object can be a thin-shelled member; receiving information identifying a discretization of the computer-generated object, which discretization can include a plurality of nodes; receiving information identifying a set of material properties for the computer-generated object; applying constraints to the discretization; and solving for nodes of the constrained discretization, which constrained discretization has the same structure as the unconstrained discretization.

One aspect of the present disclosure relates to a method for simulation of deformation of a cloth member. The method includes receiving at one or more computer systems, information identifying a computer-generated object, which computer-generated object includes a cloth member; receiving information identifying a discretization of the computer-generated object, which discretization includes a plurality of nodes; receiving information identifying a set of material properties for the computer-generated object; and solving for nodes of the discretization via algebraic multigrid.

In some embodiments, the method includes applying constraints to the discretization. In some embodiments, the constrained discretization has the same structure as the unconstrained discretization proximate to the applied constraints. In some embodiments, a constraint can comprise one or several constrained nodes of the discretization, which constrained nodes can be, for example, affected by a collision. In some embodiments, a part of the discretization is proximate to an applied constraint when it is within an area defined by a distance of no more than 1 node from one of the constrained nodes, no more than 2 nodes from one of the constrained nodes, no more than 5 nodes from one of the constrained nodes, no more than no more than 10 nodes from one of the constrained nodes, no more than 20 nodes from one of the constrained nodes, no more than 50 nodes from one of the constrained nodes, no more than 100 nodes from one of the constrained nodes, no more than 500 nodes from one of the constrained nodes, and/or any other or intermediate number of nodes from one of the constrained nodes. In some embodiments, solving for nodes of the discretization comprises solving for nodes of the constrained discretization.

In some embodiments, receiving information identifying the discretization of the computer-generated object includes generating a matrix, which matrix includes data relevant to the nodes of the discretization. In some embodiments, the data relevant to the nodes of the discretization data includes location and force data. In some embodiments, solving for nodes of the constrained discretization includes iteratively solving for the nodes of the constrained discretization at a plurality of time points via a conjugate gradient method without filtering an output of an iteration of the conjugate gradient method.

In some embodiments, the constraints applied to the discretization are based on predicted collisions. In some embodiments, applying constraints to the discretization includes pre-filtering of the nodes from the discretization based on predicted collisions by generating a modified matrix. In some embodiments, the matrix is modified by replacing data relevant to nodes affected by collisions with dummy variables. In some embodiments, the matrix is modified by operations with an orthogonal projection matrix onto a constraint null space.

In some embodiments, generating a preconditioner via a preconditioning algorithm includes generating a diagonal preconditioner. In some embodiments, the method includes generating a preconditioner via a preconditioning algorithm. In some embodiments, generating a preconditioner via a preconditioning algorithm includes generating a smoothed aggregation preconditioner. In some embodiments, generating the smoothed aggregation preconditioner is based on the modified matrix and includes generating a near-kernel matrix. In some embodiments, the pre-filtering of the nodes retains the same discretization as before pre-filtering.

One aspect of the present disclosure relates to non-transitory computer-readable medium storing computer-executable code for simulation of deformation of a cloth member. The non-transitory computer-readable medium including: code for receiving at one or more computer systems, information identifying a computer-generated object, which computer-generated object includes a thin-shelled member; code for receiving information identifying a discretization of the computer-generated object, which discretization includes a plurality of nodes; code for receiving information identifying a set of material properties for the computer-generated object; and code for solving for nodes of the discretization via algebraic multigrid.

In some embodiments, the non-transitory computer-readable medium can include code for applying constraints to the discretization. In some embodiments, the constrained discretization can have the same structure as the unconstrained discretization proximate to the applied constraints. In some embodiments, a constraint can comprise one or several constrained nodes of the discretization, which constrained nodes can be, for example, affected by a collision. In some embodiments, a part of the discretization is proximate to an applied constraint when it is within an area defined by a distance of no more than 1 node from one of the constrained nodes, no more than 2 nodes from one of the constrained nodes, no more than 5 nodes from one of the constrained nodes, no more than no more than 10 nodes from one of the constrained nodes, no more than 20 nodes from one of the constrained nodes, no more than 50 nodes from one of the constrained nodes, no more than 100 nodes from one of the constrained nodes, no more than 500 nodes from one of the constrained nodes, and/or any other or intermediate number of nodes from one of the constrained nodes. In some embodiments, solving for nodes of the discretization comprises solving for nodes of the constrained discretization.

In some embodiments, receiving information identifying the discretization of the computer-generated object includes generating a matrix, which matrix includes data relevant to the nodes of the discretization. In some embodiments, the constraints applied to the discretization are based on predicted collisions. In some embodiments, applying constraints to the discretization includes pre-filtering nodes from the discretization based on predicted collisions by generating a modified matrix. In some embodiments, the matrix is modified by replacing data relevant to nodes affected by collisions with dummy variables. In some embodiments, the matrix is modified by operations with an orthogonal projection matrix onto a constraint null space.

In some embodiments, the non-transitory computer-readable medium includes code for generating a preconditioner via a preconditioning algorithm. In some embodiments, generating a preconditioner via a preconditioning algorithm includes generating a diagonal preconditioner. In some embodiments, generating a preconditioner via a preconditioning algorithm includes generating a smoothed aggregation preconditioner. In some embodiments, generating the smoothed aggregation preconditioner is based on the modified matrix and includes generating a near-kernel matrix. In some embodiments, the pre-filtering of the nodes retains the same discretization from before pre-filtering.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Introduction

While multigrid methods potentially promise to deliver a solution to a wide variety of discrete equations in a compute time proportional to the number of unknowns, multigrid methods are, however, difficult to design for new applications so that they perform optimally across a wide range of problem sizes, especially when constraints are introduced.

Cloth simulation has provided some difficulties for multigrid methods. The broader but related problem of thin shell simulation also has numerous applications in engineering. Common for all of the applications is that higher resolution leads to higher fidelity, but often also prohibitive computation times for conventional methods.

Existing multigrid approaches to these types of problems typically require structured meshes and have difficulty with collisions. Furthermore, their convergence rates and scaling properties are often not as good as one would want or expect.

Existing multigrid methods for cloth simulation are based on geometric multigrid. Geometric methods are problematic in the face of unstructured grids, widely varying material properties, and varying anisotropies, and they often have difficulty handling constraints arising from collisions. As disclosed herein, the algebraic multigrid method known as smoothed aggregation can be applied to cloth simulation. This method is agnostic to the underlying tessellation, which can even vary over time, and it only has the user to provide a fine-level mesh. To handle contact constraints efficiently, a prefiltered preconditioned conjugate gradient (referred to herein as "PPCM") method is disclosed herein. For highly efficient preconditioners, like the ones proposed here, pre-filtering can be beneficial, but, even for simple preconditioners, prefiltering provides significant benefits in the presence of many constraints. Numerical tests of the new approach on a range of examples confirm 6-8× speedups on a fully dressed character with 371 k vertices, and even larger speedups on synthetic examples.

System Overview

Figure 1:
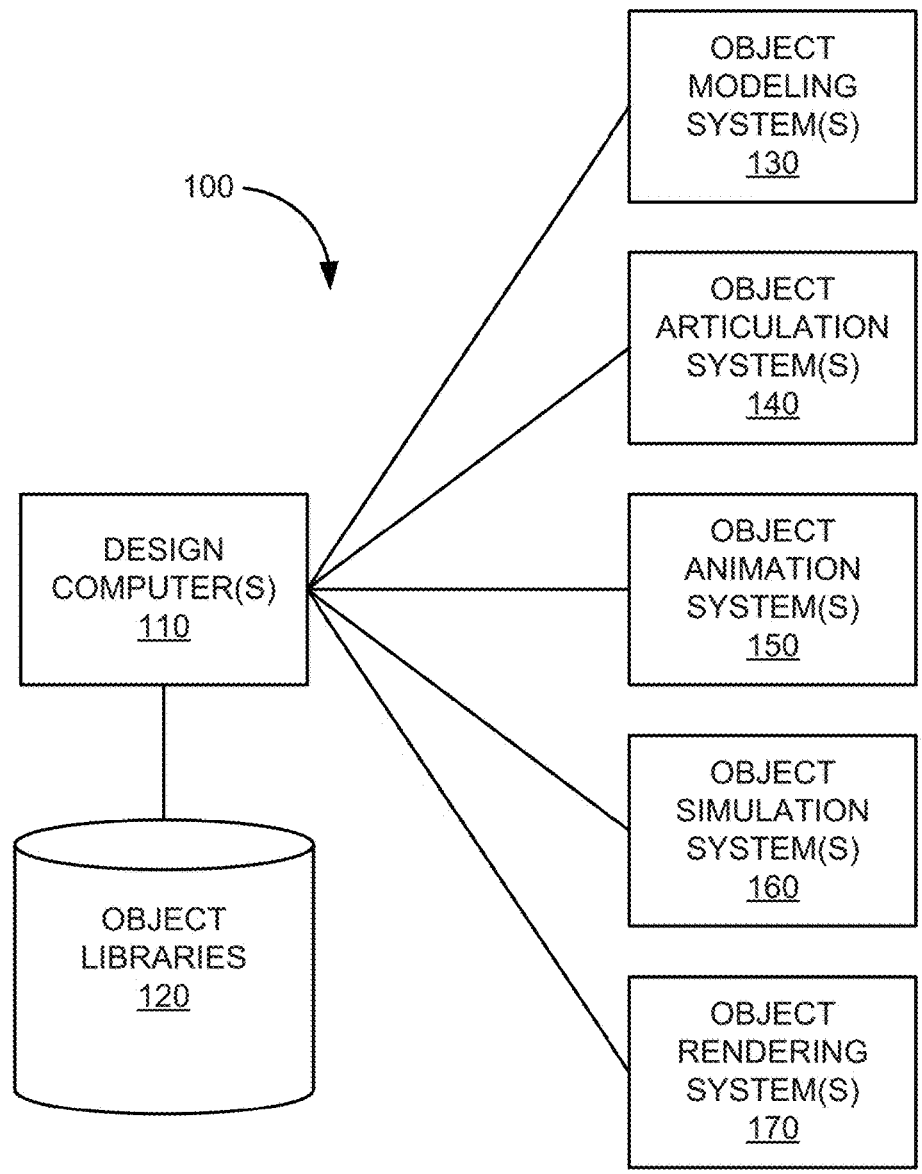
FIG. 1 is a simplified block diagram of a system for creating computer graphics imagery (CGI) and computer-aided animation that may implement or incorporate various embodiments or techniques for simulating deformation.

FIG. 1 is a simplified block diagram of system 100 for creating computer graphics imagery (CGI) and computer-aided animation that may implement or incorporate various embodiments or techniques for cloth simulation. In this example, system 100 can include one or more design computers 110, object library 120, one or more object modeler systems 130, one or more object articulation systems 140, one or more object animation systems 150, one or more object simulation systems 160, and possibly one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages.

In various embodiments, the one or more object modeling systems 130 may be configured to generate a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulate one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages.

In various embodiments, the one or more articulation systems 140 can be configured to enable the specification of rigging for an object, such as for internal skeletal structures or external features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animation variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages.

In various embodiments, the one or more object simulation systems 160 may be configured to enable users to create, define, or edit simulation engines, such as a physics engine or physics processing unit (PPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170.

Multigrid Fundamentals

Multigrid relies on two complementary processes: smoothing (or relaxation) to reduce "oscillatory" errors associated with the upper part of the spectrum, and coarsening (or coarse-grid correction) to reduce "smooth" errors associated with the lower part of the spectrum. Many choices exist for smoothing, but the various multigrid methods are distinguished mostly in how they coarsen.

Multigrid draws heavily on discretization methodology. Thus, effective coarsening for a given discrete problem often mimics a real or imagined discretization process that produced the problem in the first place. Basically, what is an effective way to construct a grid from the continuum should be an effective way to construct a coarse grid from the fine grid. Geometric Multigrid (GMG) methods rely on the ability to coarsen a grid geometrically and to (explicitly or implicitly) define discretizations on coarser grids, as well as interpolation operators between the grids. Unfortunately, geometric multigrid methods can be difficult to develop for problems with unstructured grids, complex geometries, and widely varying coefficients and/or anisotropies. As a convenient alternative to GMG methods, Algebraic Multigrid (AMG) and its cousin Smoothed Aggregation (SA) were developed to provide automatic processes for coarsening based solely on the target matrix. AMG coarsens a grid algebraically based on the relative size of the entries of the matrix to determine strong connections, thereby forming a hierarchy of grids from the finest, on which the original problem is defined, down to the coarsest, which typically consists of just a few degrees of freedom. The AMG coarsening process produces coarse grids whose degrees of freedom are subsets of those on the fine grid (represented by identity rows in the interpolation matrix). Thus, while AMG is an algebraic approach, a geometric representation of coarse-grid nodes in the continuum is still easily determined.

For linear finite element discretizations of Poisson's equation on regular 2D grids, the parameters for AMG can be selected to produce the usual geometric coarsening with linear interpolation. In this case, the coarse-grid matrix is essentially what FE would produce by rediscretization on the coarse grid. AMG and GMG solvers would then have similar interpolation, restriction, and coarse-grid components. It is thus often safe to make assumptions about the convergence of a standard GMG approach by looking at the convergence of an AMG implementation. Yet AMG can automatically produce effective coarse levels for many problems that do not lend themselves to geometric approaches.

Smoothed aggregation (SA) is an advanced aggregation-based method founded on algebraic multigrid principles. When coarsening the grid, these methods form agglomerates (by grouping fine-grid nodes) that each become a node of the coarse grid. The points that go into agglomerates are also formed based on relative strength between elements of the matrix. However, for standard SA, coarse nodes do not correspond to single fine-grid nodes. So, for vertex-centered discretizations, it is generally not possible to assign geometric meaning to the coarse grids that SA produces, especially for systems of Partial Differential Equations (PDE). SA is more akin to cell-centered discretizations, where the aggregates can be interpreted as coarse cells. Smoothed aggregation also tends to coarsen more aggressively than AMG and GMG, so the coarse matrices and interpolation operators generally must work harder to obtain efficiency comparable to that of AMG and GMG.

Once a coarse grid has been selected, then an interpolation operator, P, must be formed that maps coarse-grid functions to finer-grid ones. Selection of the interpolation operator can be guided by classical multigrid theory. It is important to note that solving a fine-grid matrix equation of the form Au=f, where A is symmetric positive definite, is equivalent to minimizing the discrete energy functional given by $F(v) = \langle Av, v \rangle - 2\langle v, f \rangle$. A little algebra shows that the best coarse-grid correction to a fixed approximation, v, in the sense of minimizing $F(v - Pv^c)$, is ex-pressed by $$v \leftarrow v - P(P^T A P)^{-1} P^T (Av - f).$$

This objective leads to the two so-called variational conditions that are used in forming AMG/SA hierarchies: restriction from the coarse to the fine grid is the transpose of interpolation and the coarse-grid matrix is given by the "Galerkin" product $A^c \equiv P^T A P$. GMG by comparison is often done by re-discretizing the problem on the coarse levels to obtain $A^c$, and then computing is often done by re-discretizing the problem on the coarse levels to obtain $A^c$, and then computing $$v \leftarrow v - P(A^c)^{-1} P^T (Av - f).$$

To construct an effective interpolation operator, it is important to understand why conventional iterative methods tend to work well for a couple of iterations, but then soon stall. This is due to the error quickly becoming smooth and difficult to reduce. But this smoothing property is the object of relaxation. The basic idea is that smooth error can then be eliminated efficiently on coarse levels. For coarsening to work well this way, interpolation must adequately approximate smooth errors, as articulated in the following property. (Here and in what follows, $\|\cdot\|$ and $$\|\cdot\|_A \equiv \|A^{\frac{1}{2}} \cdot \|$$

denote respective Euclidean and "energy" norms.)

The Strong Approximation Property (SAP)

The SAP holds if a fine-grid error, e, can be approximated in the energy norm by the coarse grid with accuracy that depends on the Euclidean norm of its residual, Ae:

$$\min_{u^c} \|e - Pu^c\|_A^2 \leq \frac{C}{\|A\|} \langle Ae, Ae \rangle.$$

Let any vector e be called a near-kernel component if either $\|e\|^2$ is small compared to $$\frac{\langle e, Ae \rangle}{\|A\|}$$

or $\|e\|_A^2$ is small compared to $$\frac{\langle Ae, Ae \rangle}{\|A\|}.$$

The SAP is sufficient to guarantee V-cycle convergence and it creates a clear goal for the interpolation operator in that the interpolation operator must, at the very least, adequately approximate near-kernel components. However, the global nature of the energy norm that the SAP is based on makes it somewhat difficult to use as a design tool. It is more common in practice to develop schemes with estimates based on the Euclidean norm, as the following weaker property provides.

The Weak Approximation Property (WAP)

The WAP holds if a fine-grid error, e, can be approximated in the Euclidean norm by the coarse grid with accuracy that depends on its energy norm:

$$\min_{u^c} \|e - Pu^c\|^2 \leq \frac{C}{\|A\|} \langle Ae, e \rangle.$$

Developing schemes based on the WAP is easier because estimates involving the Euclidean norm can be made locally in neighborhoods of a few elements or nodes. This locality provides the basis for the classical development of both AMG and SA. Unlike the SAP, however, the WAP itself is not enough to ensure V-cycle convergence, which is why interpolation-operator smoothing is used in aggregation-based methods.

Standard GMG and AMG are examples of so-called unknown-based multigrid methods, where the degrees-of-freedom (DOF) are coarsened and interpolated separately. To illustrate this approach, note that linear elasticity involves three displacement unknowns, whose discrete vector functions we label $u_1$, $u_2$, $u_3$. The resulting matrix, A, can therefore be written in the form $$A = \begin{bmatrix} A_{1,1} & A_{1,2} & A_{1,3} \\ A_{2,1} & A_{2,2} & A_{2,3} \\ A_{3,1} & A_{3,2} & A_{3,3} \end{bmatrix}, \quad (1)$$

where each block is of size n×n, with n the number of nodes used in the discretization. Interpolation and coarsening are then constructed based on the block diagonals to form the full Interpolation operator $$P = \begin{bmatrix} P_{1,1} & 0 & 0 \\ 0 & P_{2,2} & 0 \\ 0 & 0 & P_{3,3} \end{bmatrix}. \qquad (2)$$

The coarse-grid matrix is then formed using the Galerkin operator $P^T A P$. This works well when the PDE is dominated by the connections within the unknowns. However, for problems like elasticity with strong off-diagonal connections, unknown-based approaches can suffer poor convergence and scaling.

Another choice for applying multigrid to systems of PDEs is the nodal approach, where the fine-grid matrix is structured in blocks of the same size as the number of unknowns in the PDE at each grid point. This approach complicates the determination of strength between nodes and, in turn, coarsening, but it provides a bridge to smoothed aggregation. Instead of coarsening a grid by identifying a set of nodes that become the coarse grid, SA partitions the grid into aggregates that are strongly interconnected. Akin to how finite elements uses local functions, SA then assigns each aggregate a basis of local vectors that can be linearly combined with each other and bases of the other aggregates to adequately (according to the WAP) approximate all fine-grid smooth error. The coefficients in these linear combinations constitute the coarse-grid unknowns. This form gives SA the natural ability to interpolate across unknowns, and it has the added benefit of being able to fit a much richer set of errors.

In summary, the multigrid methodology involves approximating the algebraically smooth error left by relaxation by forming a coarse grid and an interpolation operator from it to the fine grid that adequately represents these errors in accordance with the WAP. SA, in particular, approximates algebraically smooth errors by choosing aggregates of nodes that are connected strongly enough to enable one or a few basis elements to represent these errors locally, with the WAP guiding the choice of the basis elements that properly approximate these smooth errors.

Simulation Method

Figure 2:
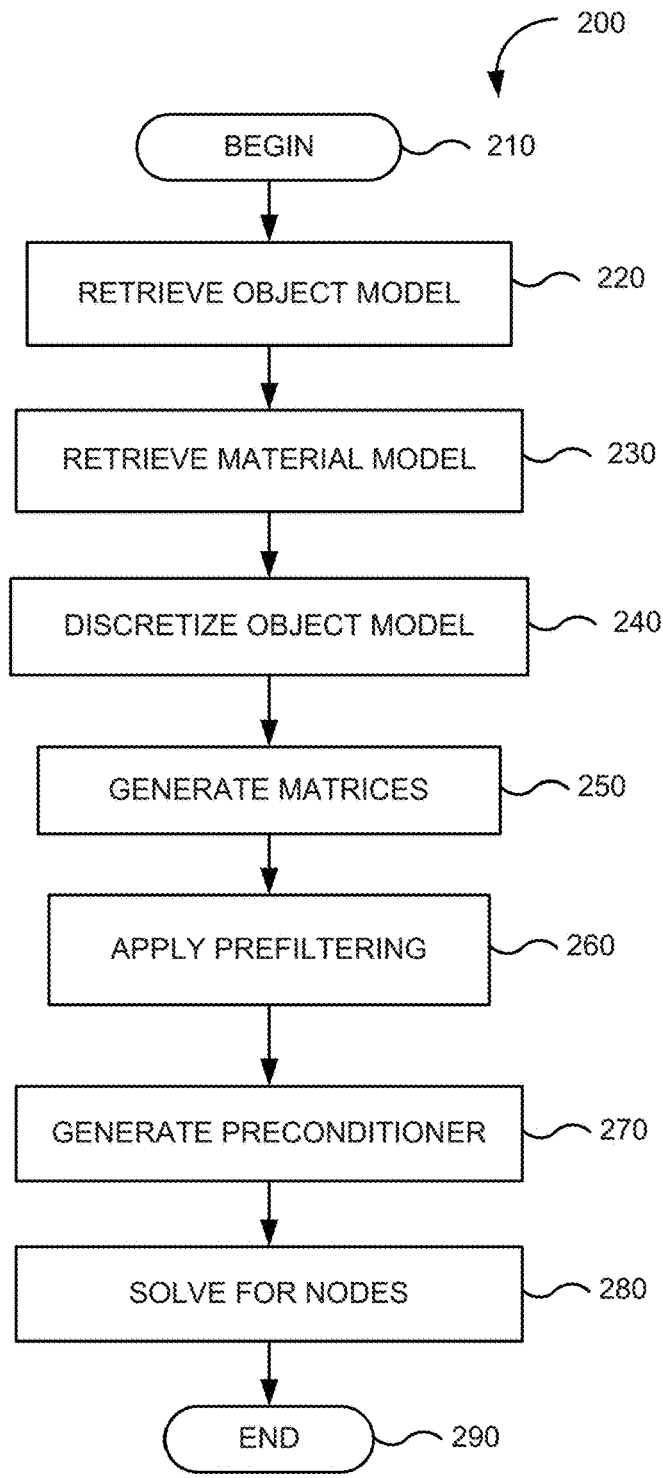
FIG. 2 is a flowchart illustrating one embodiment of a process for thin-shelled member simulation.

FIG. 2 is a flowchart illustrating one embodiment of a process 200 for thin-shelled member simulation, and specifically for cloth simulation. In some embodiments, the process 200 can be embodied in computer code stored on or in a non-transitory computer readable medium. In some embodiments, simulation of a thin-shelled member can be performed using any desired linear solver, and in some embodiments, the thin-shelled member can be modelled based on a Baraff-Witkin cloth model. In some embodiments, simulation of a thin-shelled member can be performed by an algebraic method, such as an algebraic multigrid method, which algebraic method can, in some embodiments, be based on smoothed aggregation. In some embodiments, the algebraic method can be used as a preconditioner for a solver such as, for example, an iterative solver that can be, for example, based on the conjugate gradient method.

In some embodiments, the simulation of a thin-shelled member can be performed by a method which can retains the same block structure and/or the same discretization structure as exists in the unconstrained system. In some embodiments, this retention of the same block structure and/or the same discretization structure as exists in the unconstrained system can be achieved according to the process 200. In some embodiments, simulation of a thin-shelled member can be performed by method wherein collisions are handled via at least one of: constraints; and penalty forces.

While specifically referred to herein for use in simulation of thin-shelled members, process 200 can be performed to any object experiencing forces and/or deformations. Implementations of processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

The process 200 begins at block 210. At block 220, an object model is retrieved and/or received. In some embodiments, the object model can be a computer generated object which can be received at one or several computers or computer systems. The received model is an electronic representation of one or several objects or items, which objects or items can be real or imagined. In some embodiments, the received model can be of one or several thin-shelled objects, members, or items, and specifically of one or several pieces of cloth. The model can be generated in a variety of methods including through the use of graphics, scanning, drafting, or animation software. In some embodiments, the one or several objects or items can be thin-shelled members such as one or several pieces of cloth, paper, polymer, rubber, latex, or the like. As used herein, a thin-shelled member refers to an object that has a thickness of less than 10% of its length or width, less than 5% of its length or width, less than 2% of its length or width, less than 1% of its length or width, less than 0.5% of its length or width, less than 0.1% of its length or width, and/or any other or intermediate percent of its length of width. As used herein, "cloth" or "fabric" refers to a woven, knit, or felted material made from natural or synthetic fibers, or a synthetic material such as vinyl fabric or other polymer fabric. In some embodiments, the model can be generated by the design computer 110 and/or retrieved or received from the object libraries 120 or other source.

At block 230 a material model is retrieved and/or selected. The material model can specify and/or designate one or several material properties of the object model of block 220. These material properties can include, for example, one or several parameters defining elasticity, flexibility, mass, color, opacity, strength, hardness, or the like. In some embodiments, the material model can further include a method of implementing these parameters into a simulation. This can include, for example, one or several equation, relationships, or the like that can describe the desired kinetic behavior of the object model in block 220.

At block 240 the object model is discretized. In some embodiments, the discretization of the object model can include receiving and/or identifying a discretization of the object model. This discretization can include generating a mesh and/or the dividing of the object model into sub-components or sub-units. This mesh and/or these sub-components or sub-units can be defined by one or several sides which can be any desired shape including, for example, which can be polygonal. In some embodiments, the discretization can be performed according to any desired method or technique including, for example, one or several Finite Element methods or techniques. In some embodiments, the discretization of the object model can include the creation of a plurality of vertices or nodes within the object model.

At block 250, one or several matrices are generated. In some embodiments, these matrices can include a matrix A containing data relating to the vertices or nodes of the object model at one or several points in time. In some embodiments, the data relating to the vertices or nodes of the object model can include location data identifying the location of the associated node or vertex, such as, for example, identifying the location of the node or vertex in 2D or 3D space. In some embodiments, the data relating to the vertices or nodes of the object model can include force data identifying, for example, one or several forces applied to an associated node or vertex. The matrices can include a matrix K which can be the near-kernel matrix, also referred to as the near-nullspace matrix.

At block 260 prefiltering is applied, and specifically, prefiltering is applied to the matrix A. In some embodiments, this prefiltering can be based on one or several predicted collisions. In some embodiments, the prefiltering can include identifying one or several nodes affected by one or several predicted collisions, identifying data in matrix A associated describing those one or several nodes, and removing some or all of that data from matrix A. In some embodiments, this can result in the creation of a modified matrix A. In some embodiments, the data removed from matrix A can be replaced by one or several dummy variables. This replacement of the removed data with one or several dummy variables can result in the maintaining of the discretization structure, and specifically can result in maintaining the same discretization as before the prefiltering. In some embodiments, matrix A can be modified by operations with an orthogonal projection matrix onto a constraint null space.

At block 270, a preconditioner is generated by, for example, a computer or computer system according to a preconditioning algorithm. In some embodiments, this preconditioner can condition a given problem into a form that is more suitable for numerical solving methods. Specifically, the preconditioner can condition the matrix A into a form that is more suitable for numerical solving methods. In some embodiments, the preconditioning algorithm can be a diagonal preconditioner, and in some embodiments, the preconditioning algorithm can be a smoothed aggregation preconditioner. In some embodiments, the smoothed aggregation preconditioner can use the matrix K and the modified matrix A.

At block 280, the process solves nodes at a plurality of time points, and specifically solves nodes at a plurality of time points via a conjugate gradient method. In some embodiments, this can include the solving for locations of nodes and/or for the solving of forces applied to nodes at one or several time points. In some embodiments, this can include solving the output of the generated preconditioner and/or solving the preconditioner matrix A. The process 200 ends at block 290.

Smoothed Aggregation Preconditioner

Smoothed Aggregation (SA) can be used to create a hierarchy of matrices and the corresponding interpolation operators between successive levels. The construction in SA of a hierarchy of matrices and the corresponding interpolation operators between successive levels proceeds in three stages: selection of aggregates ($\mathcal{A}_i$ on level i=1, 2, ..., m from fine to coarse grids), forming interpolation operators ($P_i$), and then forming coarse-grid operators ($A_{i+1}=P_i^T A_i P_i$). Since SA is a nodal approach, on any given level i of the hierarchy, $A_i$ is assumed to have $n_i$ nodes, each corresponding to $b_i \times b_i$ blocks. $A_i$ is block $n_i \times n_i$ when considered nodally and $(n_i \cdot b_i) \times (n_i \cdot b_i)$ when all unknowns are considered.

Smoothed aggregation assumes existence of a set of near-kernel components that constitute the columns of matrix K. This near-kernel matrix is used below to construct bases for the agglomerates. K must have the property that any near-kernel component e must be adequately approximated (according to the WAP) in each aggregate by a linear combination of the columns of K restricted to that aggregate. For scalar Poisson equations, one near-kernel component (typically the constant vector) is usually enough to obtain good performance. For 2D linear elasticity, three components (typically a constant each for the two displacement unknowns and a rotation) can be needed.

The first step in aggregating nodes is to form a strength-of-connection (SOC) matrix, S, which serves multiple purposes. Its primary function is to provide a structure where "strength" between any pair of nodes in the "grid" is stored. This is used to decide which nodes are strongly interconnected so that they can be grouped together into small local aggregates. In some embodiments, S can be used to treat a problem caused by anisotropy. The problem arises because interpolation should be in the direction of strength, but smoothing that is used to improve the interpolation operator can smear in the direction of weakness. S can be used to identify the potential for this smearing and filter smoothing by eliminating the weak connections in the matrix.

The SOC matrix is usually chosen with a sparsity pattern that is a subset of the original nodal matrix. This can be advantageous in the implementation. In general, S is not needed after setup, so it can be discarded after that phase. Usually, the strength between nodes is defined in a way that allows S to be symmetric, and the cost of assembling S is reduced to constructing the upper (or lower) triangular part of the matrix. Classically, the strength between nodes is defined as $$s_{ij} = \begin{cases} 1, & i = j, \\ 1, & |\rho(A_{ii}^{-1/2} A_{ij} A_{jj}^{-1/2})| > \theta \cdot \rho_{i,max}, \\ 0, & \text{otherwise} \end{cases}$$

where $\rho_{i,max} = \max_{j \neq i} |\rho(A_{ii}^{-1/2} A_{ij} A_{jj}^{-1/2})|$, and $\theta \in (0,1)$. $s_{ij}$ effectively determines strength relative to other off-diagonals in row i. Also, $A_{ij}$ here refers to the block (of size $b_1 \times b_1$) associated with a nonzero in the matrix between nodes i and j.

To facilitate description of the aggregation process, denote the set of fine-level nodes by $\mathcal{D}_1 = \{1, 2, \ldots, n_1\}$. Define set $\mathcal{S}$ to be the special nodes, which means those that are not strongly connected to any other node or that correspond to a row in the matrix that is very diagonally dominant. Relaxation leaves little to no error at the special nodes, so they need not be interpolated to or from coarser levels and are therefore gathered into one aggregate that is not affected by interpolation from coarser levels.

The next phase constructs a fine-level, $\{\mathcal{A}_1, \mathcal{A}_2, \ldots, \mathcal{A}_{n_2}\}$, of $\mathcal{D}_1 \setminus \mathcal{S}$ into disjoint aggregates:

$$\mathcal{D}_1 \setminus \mathcal{S} = \cup_{i=1}^{n_2} \mathcal{A}_i, \quad \mathcal{A}_i \cap \mathcal{A}_j = \emptyset, \forall i \neq j.$$

Each aggregate here forms a node on the coarse level. This phase is accomplished in three steps: special nodes are first identified, and then two passes are performed through the nodes. In the first pass, an initial set of aggregates is formed and, in the second, all unaggregated nodes are assigned to existing aggregates.

The goal of the first pass is to create a set of aggregates from a maximally independent set of strongly connected nodes. One way to do this is outlined here. Each node is examined once in turn, in any logical order. If none of the current node's strongly connected neighbors are in an aggregate, then they join the current node to form a new aggregate. Otherwise, the current node is left alone and the next node is examined similarly. More specifically, let R be the set of node indices that are not currently assigned to an aggregate. Initially, $\mathscr{R} = \mathscr{D}_1 \backslash \mathscr{S}$. Let $N_i = \{j: S_{ij}=1, i \neq j\}$ be the set of points that are strongly connected to point i. The first pass is outlined in the following algorithm.

---
Algorithm 1 Form aggregates, pass 1
---

1: input Set of nodes, $\mathscr{D}$, and SOC matrix, S.
2: $\mathscr{R} = \mathscr{D}$
3: k = 0
4: for i = 1,...,$n_1$ do
5:      Form $\mathscr{N}_i = \{j : s_{ij} = 1, i \neq j\}$
6:      if $\mathscr{N}_i \cap \mathscr{R} = \mathscr{N}_i$ then
7:          $\mathscr{A}_k = \mathscr{N}_i \cup \{i\}$
8:          k = k + 1
9:          $\mathscr{R} = \mathscr{R} \backslash (\mathscr{N}_i \cup \{i\})$
10:     end if
11: end for
12: $n_2$ = k
13: return Aggregates, $\mathscr{A}_1, \ldots, \mathscr{A}_{n_2}$, and still un-aggregated nodes $\mathscr{R}$.

---

After the initial set of aggregates is formed, a subset of unaggregated nodes, $\mathscr{R}$, remains. The goal now is to attach the nodes in $\mathscr{R}$ to aggregates in the list $\mathscr{A}_1, \ldots, \mathscr{A}_{n_2}$. This can be done by looping over each aggregate and assigning to it all nodes left in $\mathscr{R}$ that are strongly connected to one of its nodes. (An alternative is to loop over each node in $\mathscr{R}$, assigning it to the aggregate that it is most strongly connected to.) Since all non-special nodes are strongly connected to at least one node, then this step ensures that they will all be aggregated. Note that each aggregate is represented by a node on the coarse level, so that level will have size $n_2$. This step is outlined in the following algorithm.

---
Algorithm 2 Form aggregates, pass 2
---

1: input Aggregates, $\mathscr{A}_1, \ldots, \mathscr{A}_{n_2}$, and still un-aggregated nodes $\mathscr{R}$.
2: for i = 1,...,$n_2$ do
3:      Let $m_i$ be the number of elements in $\mathscr{A}_i$
4:      for j = 1,...,$m_i$ do
5:          Form $\mathscr{A}_j$
6:          Let $P_j = \mathscr{N}_j \cap \mathscr{R}$
7:          for k ∈ $P_j$ do
8:              $\mathscr{A}_i = \mathscr{A}_i \cup \{k\}$
9:              $\mathscr{R} = \mathscr{R} \backslash \{k\}$
10:        end for
11:     end for
12: end for
13: return An independent set containing all nodes, $\mathscr{A}_1, \ldots, \mathscr{A}_{n_2}$.

---

Interpolation is constructed in two basic steps. The first involves choosing a tentative interpolation operator, $\hat{P}$, so that the set of near-kernel components, K, is in its range and $\hat{P}$ does not connect neighboring aggregates, so $\hat{P}^T\hat{P}=I$. To see how this is done, assume that the nodes are ordered so that they are contiguous within each aggregate and in correspondence to the aggregate ordering. (This ordering is not necessary in practice, but used here simply to facilitate the discussion.) The near kernel can then be decomposed into $n_2$ blocks denoted by $K_1, K_2, \ldots, K_{n_2}$ and written in block form as $K=[K_1^T K_2^T \ldots K_{n_2}^T]^T$. Note that the number of nonzero rows of $K_i$ equals the number of nodes in $\mathscr{A}_i$ times the nodal block size ($b_i$) and the number of columns equals the number, $\kappa$, of near-kernel components.

A local QR of each block can now be formed: $K_i = Q_i R_i$, $Q_i^T Q_i = I$, which yields the matrices $\{Q_1, \ldots, Q_{n_2}\}$ and $\{R_1, \ldots, R_{n_2}\}$. The columns of $Q_i$ then form a local basis spanning the near kernel in $\mathscr{A}_i$. Given this decomposition, the tentative interpolation operator, $\hat{P}$, is then formed via $$\hat{P} = \begin{bmatrix} Q_1 & 0 & 0 & 0 \\ 0 & Q_2 & 0 & 0 \\ \vdots & & \ddots & \vdots \\ 0 & \ldots & 0 & Q_{n_2} \end{bmatrix}, R = \begin{bmatrix} R_1 \\ R_2 \\ \vdots \\ R_{n_2} \end{bmatrix}.$$

Note that $\hat{P}^T\hat{P}=I$ by construction.

A coarse near kernel can be determined to allow for recursion to coarser levels. But $K=\hat{P}R$ means that the fine-level near kernel can be exactly represented on the coarse level by simply choosing $K_c=R$. Note then that, with $A_c=\hat{P}^T A\hat{P}$, we have $A_c K_c = \hat{P}^T A\hat{P}R \approx \hat{P}^T 0 = 0$.

This local non-overlapping use of the near kernel may generally satisfy the weak approximation property, but not the strong one needed to ensure optimal V cycle performance. To improve accuracy of the interpolation operator, the interpolation operator can be smoothed by applying the weighted Jacobi error propagation matrix: $P=(I-\omega D^{-1} A)\hat{P}$. In some embodiments, the diagonal matrix, D, whose diagonal agrees with that of A, can be used because it does not change the sparsity pattern of P and it responds better to the local nature of A. A typical choice for $\omega$ $$\frac{4}{3\rho(D^{-1}A)},$$

with care needed in estimating $\rho(D^{-1}A)$. The cost of this i estimation is amortized over the use of Chebyshev as a smoother in the resulting solver. Smoothed interpolation, while generally causing overlap in the aggregate basis functions so that $P^T P \neq I$, often leads to an optimal V-cycle algorithm. Also, the smoothed near kernel is exactly in the range of smoothed interpolation: $PK_c=(I-\omega D^{-1}A)\hat{P}K_c=(I-\omega D^{-1}A)K$, which generally preserves and even improves the near-kernel components in K. Note that, while the finest-level matrix has nodes with $b_1$ degrees of freedom each, all coarser levels have $\kappa$ degrees of freedom associated with each finer-level aggregate. The complexity of the coarse level is thus dictated by the number of near-kernel components and the aggressiveness of coarsening (that is, the size of the aggregates). Both choices must be controlled so that the coarse-level matrix has substantially fewer nonzero entries than the next finer-level matrix has.

The above steps outline how a given matrix and kernel pair A and K are decomposed to form a coarse level, the operators between the two levels, and the appropriate coarse matrix and kernel. The combined process is summarized in Algorithm 3. The coarsening routine is applied in a recursive fashion until there is a coarse matrix that can be easily inverted through iteration or a direct solver. Because aggregation coarsens aggressively, the number of levels is usually small, and is frequently between three to six levels.

---
Algorithm 3 Forming a coarse level in the SA hierarchy
---

Require: A, K The matrix and kernel for this level
Ensure: P, R Interpolation and restriction operators Algorithm 3 Forming a coarse level in the SA hierarchy Ensure: $A_c$, $K_c$ The coarse matrix and kernel
Precompute inverse $D^{-1}$ of block diagonal of A
Find spectral radius of $D^{-1}$ A
Smooth kernel K to match boundary conditions
Form a matrix S to determine strength
Use S to form aggregates from nodes in A
For each aggregate form local QR of K
Use the local Q blocks to form tentative interpolation
Smooth the tentative interpolation to get P
Use P to form $A_c = P^T AP$
Use local R blocks to form coarse kernel $K_c$ Null Space Near-kernel components can be obtained for many problems by examining the PDE. For example, for elasticity, ignoring boundary conditions, then it is well-known that a rigid-body mode (constant displacement or rotation) has zero strain and, therefore, zero stress. So rigid-body modes that are not prevented by boundary conditions from being in the domain of the PDE operator are actually in its kernel. Fixed boundary conditions prevent these modes from being admissible, so they cannot of course be kernel components in any global sense. But a rigid-body mode that is altered to satisfy typical conditions at the boundary becomes a near-kernel component, and they can usually be used locally to represent all near-kernel components.

To be more specific, displacements for linear elasticity are assumed to be small, thereby simplifying computation of the strain tensor. In particular, the strain is given by $$\varepsilon = \frac{1}{2}(\nabla u + \nabla u^T)$$

where u is the displacement field. In this case, it is easy to verify that the following vector functions (which represent rotations around each of the three axes) all lead to zero strain: u=(0, −z, y), u=(z, 0, −x), and u=(−y, x, 0). Here, (x, y, z) represents material (undeformed) coordinates. Since these rigid-body modes are linear functions, they should be well approximated in the interior of the domain by most finite element discretization methods. Indeed, if the finite element space includes linears, then these modes are exactly represented in the discretization except in the elements abutting fixed boundaries. All that is needed in this case is to interpolate these rigid-body modes at the nodes. In doing so, they become admissible and retain their near-kernel nature by forcing their values at the boundary nodes to satisfy any fixed conditions that might be there. For further assurance that they remain near-kernel components, a relaxation sweep may be applied, using them as initial guesses to the solution of the homogeneous equation.

Other finite element spaces may require further work to obtain discrete approximations to the rigid-body modes. For elements that do not lend themselves to interpolation of functions, this may require an $L^2$ projection or solution of some form of a hopefully well-conditioned mass matrix problem. In some embodiments, the mechanism for obtaining the discrete near-kernel components should be comparable to how the given finite element approach approximates other functions in the equations.

Smoothing

In some embodiments, multigrid can be used as a preconditioner for conjugate gradients (CG) rather than as a stand-alone solver. As a consequence, the multigrid preconditioner used should be symmetric and positive definite. This requirement has multiple implications. To ensure symmetry, the used V-cycle should be energy-symmetric and, to ensure positive definiteness, the smoother should be convergent in energy.

In some embodiments, the basic relaxation scheme can be Chebyshev, which amounts to running a fixed number of Chebyshev iterations at each level based on $D^{-1}$ A [Golub and Varga 1961]. This smoother can attenuate the desired part of the error spectrum better than any other smoother (more precisely, it minimizes the worst attenuation in that part of the spectrum among all polynomial smoothers). Further, this smoother can be implementable with mat-vec operations and can be relatively easy to parallelize compared to other smoothers like Gauss-Seidel.

Chebyshev can use an upper bound for the spectral radius of $D^{-1}$ A and an estimate of the smallest part of the spectrum desired for attenuation, the same as needed for smoothing the interpolation operator by weighted Jacobi. One approach to obtaining these estimates is to use the power method for computing the largest eigenvalue of a matrix. Unfortunately, it does not generally provide a rigorous bound on the largest eigenvalue, and its convergence rate is limited by the ratio of the two largest eigenvalues [Golub and Loan 1983]. In practice, these two eigenvalues are often very close, so that convergence is very slow, which leads to a trade-off: too loose of an approximation to the spectral radius yields slow Chebyshev smoothing rates, while tighter approximations can be costly.

Another possibility is to use Gerschgorin's theorem to estimate the largest eigenvalue, but this typically provides too loose of an approximation. A potentially better alternative is to use Lanczos's method. However, while its convergence rate is better it is also more expensive per iteration and may require careful numerical treatment to ensure convergence (e. g., periodic re-orthogonalization of the Krylov basis).

In some embodiments, an approximation to the spectral radius of $D^{-1}$ A, rather than A can be desired. While $D^{-1}$ A is not symmetric in the traditional sense, it is symmetric in the energy inner product defined by $\langle u, v \rangle_A = \langle u, Av \rangle$. In fact, for any symmetric positive definite preconditioner M:

$$\langle u, M^{-1}Av \rangle_A = \langle u, AM^{-1}Av \rangle = \langle M^{-1}Au, Av \rangle = \langle M^{-1}Au, v \rangle_A.$$

$M^{-1}$ A is also positive definite in energy because $$\langle u, M^{-1}Au \rangle_A = \langle u, AM^{-1}Au \rangle > 0$$

for any u≠0. Its eigenvalues are therefore positive, so its spectral radius can be computed by finding the largest A such that $M^{-1}$ Ax=λx, x≠0, which is clearly equivalent to the generalized eigenvalue problem Ax=λMx, x≠0. It is this latter eigen-problem to which we apply the generalized Lanczos algorithm [van der Vorst 1982] to compute the spectral radius of $M^{-1}$ A.

Prefiltering

A challenge for many of the existing multigrid methods developed for cloth simulation is proper handling of constraints. As shown in [Boxerman and Ascher 2004], superior performance can be achieved when the preconditioner is based not on the full system, but rather on the constraint null space which is the null space of the constraint operator. Some embodiments include construction of a pre-filtered matrix restricted to the constraint null space, which, in some embodiments, is neither symmetric nor easily treated by the multigrid approach disclosed herein. A reduced set of equations can be constructed based on a null-space basis for the constraints, but this leads to a system where the block size is no longer constant and, thus, higher code complexity and the difficulty that no highly optimized libraries are available that support matrices with varying block sizes. In such embodiments, operations would be done with Compressed Sparse Row (CSR) instead of Block Sparse Row (BSR) matrices, which is significantly less efficient. Instead, a reduced system is formed, but eliminated variables are replaced with dummy variables. This retains the block structure while ensuring that the preconditioner operates on the constraint null space. This method is referred to herein as Pre-filtered Preconditioned CG (PPCG).

To explain PPCG, first note that the "modified" linear system solved by [Baraff and Witkin 1998] can be written in the notation from [Ascher and Boxerman 2003] as $$\min_x \quad \|S(b - Ax)\| \quad (3)$$
$$\text{s.t.} \quad (I - S)x = (I - S)z,$$

where: $A \in \mathbb{R}^{n \times n}$ is the matrix for the full system; b is the corresponding right-hand side; S, which represents the filtering operation in [Baraff and Witkin 1998], is the orthogonal projection matrix onto the constraint null space; and z is a vector of the desired values for the constrained variables. It is assumed that A is symmetric positive definite.

Due to the constraint, any feasible point must satisfy $$x = Sx + (I - S)x = Sx + (I - S)z.$$

To incorporate this into the objective function, first noting that $$S(b - Ax) = Sb - SA(Sx + (I - S)z) = S(b - Az) - SAS(x - z).$$

By introducing $c \equiv b - Az$ and $y \equiv x - z$, the constrained minimization problem in Equation (3) can be rewritten as $$\min_y \quad \|Sc - SASy\| \quad (4)$$
$$\text{s.t.} \quad (I - S)y = 0.$$

By construction, S is symmetric and, therefore, diagonalizable. Since it is also orthogonal, it follows that the eigenvalues must be either 0 or 1. Another orthogonal matrix, Q, can be computed such that $$S = Q \begin{pmatrix} I_r & 0 \\ 0 & 0 \end{pmatrix} Q^T \equiv QJQ^T, \quad r = \dim(\text{range}(S)).$$

Partitioning Q into $V \in \mathbb{R}^{n \times r}$ and $W \in \mathbb{R}^{n \times n-r}$ such that Q=(V, W), then V is a basis for the constraint null space while W is a basis for the constrained subspace. From this decomposition, it follows that $S = VV^T$ and $I - S = WW^T$.

Similarly, let $$d \equiv \begin{pmatrix} d_1 \\ d_2 \end{pmatrix} = Q^T c, \quad u \equiv \begin{pmatrix} u_1 \\ u_2 \end{pmatrix} = Q^T y.$$

Using the last definition, we have $y = Vu_1 + Wu_2$ and, therefore, $$VV^T y = Vu_1 \text{ and } WW^T y = Wu_2. \quad (5)$$

Combining the above definitions and substituting $QJQ^T$ for S, the objective function in Equation (4) can be rewritten as follows:

$$\phi = \|Sc - SASy\|$$
$$= \|QJQ^T c - QJQ^T AQJQ^T y\|$$
$$= \|JQ^T c - JQ^T AQJQ^T y\|$$
$$= \|Jd - JQ^T AQJu\|$$
$$= \left\| \begin{pmatrix} d_1 \\ 0 \end{pmatrix} - \begin{pmatrix} V^T AV & 0 \\ 0 & 0 \end{pmatrix} \begin{pmatrix} u_1 \\ u_2 \end{pmatrix} \right\|.$$

This system can be reduced by eliminating $u_2$ since any value of $u_2$ produces the same value of $\phi$. However, eliminating $u_2$ creates a smaller system, which means that if A is block sparse with fixed block size, then the reduced system will in general be block sparse with different block sizes. It can be advantageous to keep the size of the original system in order to keep all the blocks of the same size since this allows for more efficient implementation of the sparse matrix operations. This can be achieved by leaving all the zero blocks in place, but the resulting system will then be singular, thereby introducing other problems. On the other hand, knowing from Equation (4) that $(I-S)y=0$ and, since $(I-S)y=WW^T y=Wu_2$, it follows that $u_2=0$. Minimizing $\phi$ subject to the desired constraint is therefore equivalent to solving the following linear system:

$$\begin{pmatrix} V^T AV & 0 \\ 0 & I \end{pmatrix} \begin{pmatrix} u_1 \\ u_2 \end{pmatrix} = \begin{pmatrix} d_1 \\ 0 \end{pmatrix}. \quad (6)$$

Rotating this back to the original coordinates yields $$Q \begin{pmatrix} V^T AV & 0 \\ 0 & I \end{pmatrix} Q^T Q \begin{pmatrix} u_1 \\ u_2 \end{pmatrix} = Q \begin{pmatrix} d_1 \\ 0 \end{pmatrix}$$

or, equivalently, $$(VV^T AVV^T + WW^T) y = Vd_1 = VV^T c.$$

Since $S = VV^T$ and $I - S = WW^T$, we finally arrive at $$(SAS + I - S)y = Sc. \quad (7)$$

The importance of this is that it results in a symmetric positive definite (in particular, full rank) system of the same dimensions as the original system, but which correctly projects out all of the constraints. From this system, the solution to Equation (3) is easily recovered as $x = y + z$.

Furthermore, the condition number of the new system is no worse than that of A, and may in fact be better. This conclusion is based on the assumption that 1 is in the field of values of A, which is defined to be the real numbers inclusively between the smallest and largest eigenvalues of A. (This assumption often holds for PDEs; otherwise, I−S can be multiplied by a scalar that is in A's field of values.) To prove this assertion, first note that the assumption implies that the field of values of $V^T AV$ is the same as that of the matrix in Equation (6), which is in turn the same as that of the matrix in Equation (7) because they are related by a similarity transformation. By Cauchy's interlacing theorem

[Horn and Johnson 1985], the field of values of $V^TAV$ is a subset of that of A, which immediately implies that the condition number of $V^TAV$ is bounded by the condition number of A.

For the constraints considered by [Baraff and Witkin 1998], S is block diagonal, so the computation of SAS amounts to simple blockwise row and column scaling of A, while the addition of I–S only affects the block diagonal. It should be noted that, while the derivation required S to be diagonalized, the final result does not. Referring to the system in Equation (7) as the pre-filtered system, to which a standard preconditioned CG algorithm can be applied.

The constraints considered by [Baraff and Witkin 1998] are limited to (cloth) vertices against (collision) objects. However, the above method easily generalizes to any kind of equality constraint, including the face-vertex and edge-edge constraints used in other collision response algorithms (e.g. [Harmon et al. 2008], [Otaduy et al. 2009] among others).

In particular, let $C_i(x)=0$ for $1 \le i \le m=n-r$ be a set of m equality constraints and let $C(x)=(C_1(x), \ldots, C_m(x))^T$. The (row) vectors in $\nabla C$ then span the constrained subspace similar to the $W^T$ matrix above. In order to be used in the derivations above, the vectors in W can be orthonormal, so, in some embodiments, the modified Gram-Schmidt algorithm can be used to generate $W^T$:

$$W^T = MGS(\nabla C).$$

Given W, I–S and S can be computed. Note that the overall process does not involve solving a saddle-point problem nor does it require finding a (sparse) null-space basis for the constraints. The only potential problem is that the modified Gram-Schmidt operation is not guaranteed to preserve sparseness.

Finally, it should be noted that none of the derivations in this section depend on multigrid methods: the results can be used with any type of linear solver. However, by using Equation M with smoothed aggregation, not just the dynamics, but also the constraints can be effectively coarsened.

Results

To evaluate and compare the current approach to existing methods, five procedurally generated examples are considered at different resolutions, and a high resolution production example to show its practical applicability. The five simple examples are shown in FIGS. 3A-3E, while the production example is shown in FIG. 4.

Figure 3C:
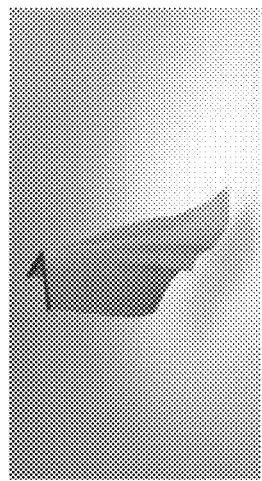
FIGS. 3A-3E depict different examples of a piece of cloth.
Figure 3B:
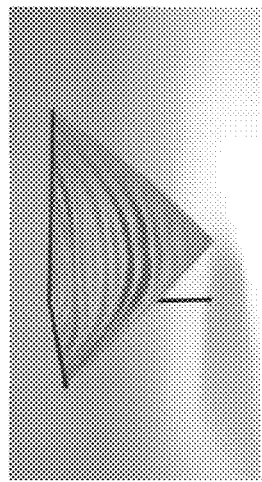
Figure 3A:
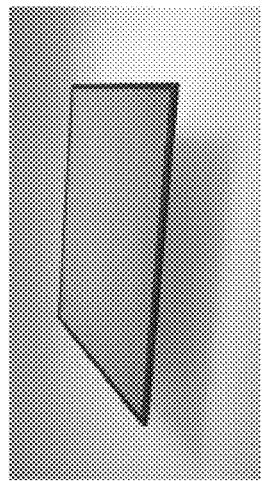
Figure 3E:
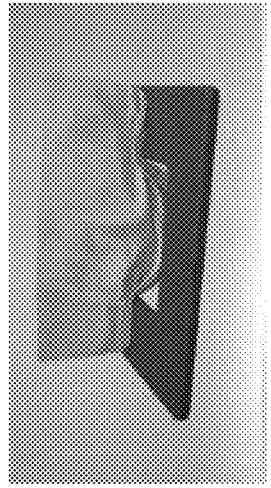
Figure 3D:
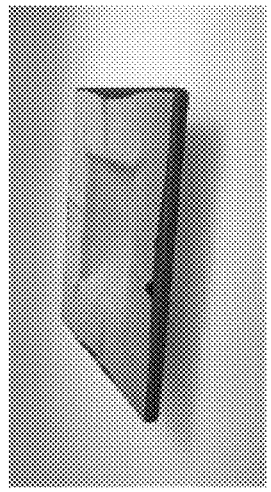
Figure 4:
FIG. 4 depicts one embodiment of a production example.

The first example, shown in FIG. 3A, is a fully pinned piece of cloth subjected to gravity. The corresponding PDE is fully elliptic with a full Dirichlet boundary, meaning in part that it is positive definite with an order 1 constant The cloth that is pinned on two sides in the second example, shown in FIG. 3B, has a smaller constant and thus provides a test to see low sensitive current methods are to variations in the strength of ellipticity. The third example, shown in FIG. 3C, has a re-entrant comer, which is more difficult yet because it does not possess full ellipticity. Indeed, for right-hand sides that are in $L^2$, the solutions are generally not in $H^2$, which means that the standard approximation properties discussed above do not apply. Standard discretization and solution methods have serious difficulties in the presence of re-entrant comers and they provide an especially challenging test problem for the current methodology. In the fourth example, shown in FIG. 3D, the cloth falls flat on a flat box with a hole in the middle. This generates many contact constraints and thus illustrates the performance of the PPCG method well. Finally, in the last example, shown in FIG. 3E, the cloth is dropped on the same box, but this time from a vertical configuration. This allows plenty of buckling and also lots of cloth-cloth collisions. The examples will be referred to as pinned, drooping, re-entrant, dropHorizontal, and drop Vertical respectively.

Each of the five simple examples are based on regular tessellations to ensure a consistent quality of tessellation at all resolutions. However, nothing in the implementation depends on this.

All results are based on simulations run on dual socket systems with Intel® Xeon® E5-2698 v3 @ 2.30 GHz processors. Each of the processors in these systems have 16 cores and each system is configured with 64 GB DDR4 RAM. All simulations were run with a time step of $\Delta t=2$ ms. The stopping criterion used in the CG is the relative residual error $\|r_i\|_{M^{-1}} / \|r_0\|_{M^{-1}} < \varepsilon$, where M is the chosen preconditioner, $$\|\cdot\|_{M^{-1}} \equiv \|M^{-\frac{1}{2}} \cdot\|,$$

$r_i$ is the residual after i iterations, and $\varepsilon$ is a given tolerance, which we set to $10^{-5}$ unless otherwise noted.

It is important to recognize that the relative residual error used to judge convergence gives an unfair advantage to poor preconditioners like the block diagonal ones. To see this, note that the relative residual is what can be computed in practice, but the following observation that this measure bounds the energy norm of the error (remembering that r=Ae) is relied on:

$$\frac{\|e_i\|_A}{\|e_0\|_A} = \frac{\|A^{-\frac{1}{2}} r_i\|}{\|A^{-\frac{1}{2}} r_0\|} = \frac{\|A^{-\frac{1}{2}} M^{\frac{1}{2}} M^{-\frac{1}{2}} r_i\|}{\|A^{-\frac{1}{2}} M^{\frac{1}{2}} M^{-\frac{1}{2}} r_0\|} \le C \frac{\|r_i\|_{M^{-1}}}{\|r_0\|_{M^{-1}}},$$

where $$C = \sqrt{\frac{\lambda_{max}}{\lambda_{min}}},$$

with $\lambda_{max}$ and $\lambda_{min}$, the respective largest and smallest eigenvalues of $$M^{-\frac{1}{2}} A M^{-\frac{1}{2}} \text{ or,}$$

equivalently, of $M^{-1}A$. This means that the practical error measure used is sharp only up to the square root of spectral condition number of $M^{-1}A$. If M is a reasonable approximation to A, then this bound is tight. If M is a not a very accurate approximation to A, as when M is its diagonal part, then convergence may occur well before the true relative energy norm of the error is sufficiently small. Said differently, diagonal preconditioned iteration has the smoothing property that the residuals they produce are very small compared to the actual error. More precisely, relaxation produces error whose relative energy norm is much larger than its relative residual norm. In other words, the smooth error left after relaxation is hidden in the residual because it consists mostly of low eigenmodes of A. SA tends much more to balance the error among the eigenmodes, so a small relative residual for SA is much more reflective of small relative energy error.

The size of the cloth in all of the examples is 1 m×1 m and the material parameters are the defaults used by in the solver. θ=0.48, but other values have been used and the results are fairly insensitive to the exact choice. If a suboptimal value is chosen, then the convergence rate will tend still to be good, but the time to solution will suffer due to excessive amounts of fill-in on the coarser levels. For smoothing, a single sweep of Chebyshev with a second-order polynomial is used. Higher order polynomials improve the convergence rate significantly, but at a price that does not make it cost-effective. For the spectral radius estimation, 10 iterations of the generalized Lanczos method were used. Once again, the convergence rate improves if this number is increased, but not in a cost-effective way. For the kernel 6 vectors were picked, one constant for each of the unknowns, and then the three rotations described in section 5.

The benchmark numbers are averages over all the solves required for 10 frames of animation for "pinned," "drooping," and "re-entrant," while 15 frames were used for "dropHorizontal" and 25 frames for "drop Vertical." These durations are chosen to capture most of the interesting behavior for each of the examples. In the following, the block diagonally preconditioned conjugate gradient is referred to as Diag-PCG, while the smoothed aggregation preconditioned conjugate gradient method with pre-filtering is referred to as SA+PPCG.

The expectation for a multigrid preconditioner is that it should improve the convergence rate of the conjugate gradient method significantly and that the convergence rate should be independent (or only weakly dependent) on the problem size. To Investigate this, let the convergence rate at iteration i be defined as $\rho_i = \|r_i\|_M / \|r_{i-1}\|_M$. The average convergence rate, $\rho$, within a single solve is then the geometric mean of these values. For an entire animation, we refer to the average convergence rate as the average over all solves of $\rho$.

Figure 5:
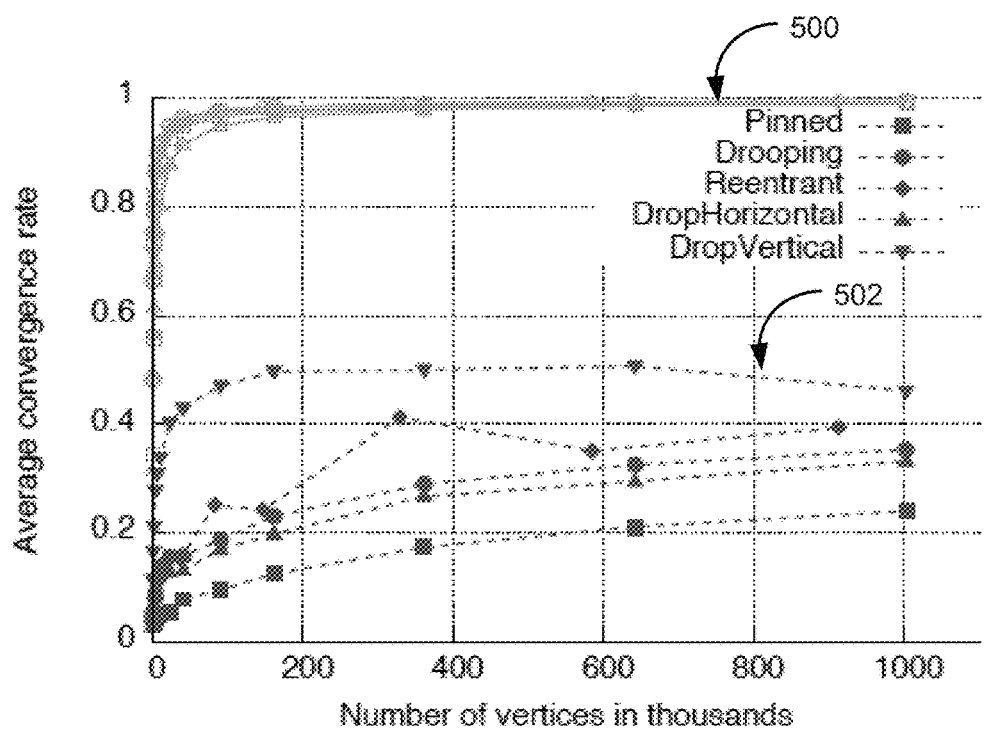
FIG. 5 is a graph depicting a comparison of convergence rates.

FIG. 5 shows the average convergence rate of SA+PPCG, indicated by lines 502, compared to Diag-PCG, indicated by line 500, for each of the five examples. While Diag-PCG approaches a convergence rate close to 1 very quickly, SA+PPCG stays bounded away from 1 at significantly lower values. Note that the pinned example converges faster than the drooping example, which in turn converges faster than the re-entrant example.

Figure 6:
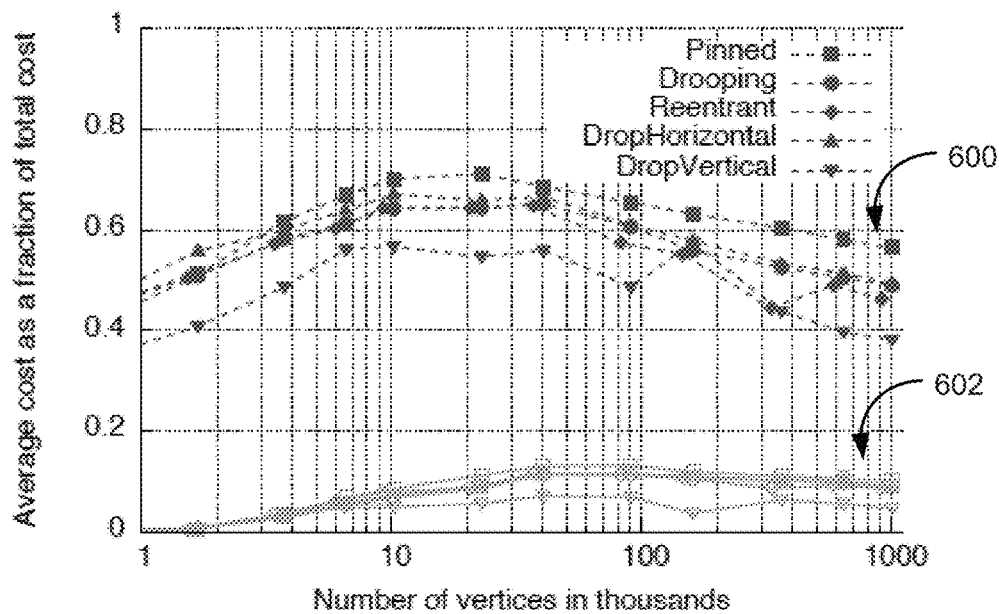
FIG. 6 is a graph showing a comparison of computational costs.

To achieve the better convergence both the cost of setup and prefiltering must be considered. Both of these are illustrated in FIG. 6, with the setup cost shown as lines 600, and the prefiltering cost shown as lines 602. The setup cost for AMG-type methods is often dominated by the cost of the triple-matrix product when forming the coarse matrices. In this case, this is still a significant cost, but not the dominant one. The computation of the spectral radius estimates is currently expensive and the computation of aggregates remains entirely serial. As such, there is room for improvement of these numbers. To reduce the setup cost, it is possible to only update the preconditioner periodically or adaptively based on the observed convergence rate.

Ultimately, the most important metric is usually time to solution. However, making fair comparisons between solvers is not entirely straightforward because different solvers have different strengths. As an example, Diag-PCG is generally attractive for systems that are highly diagonally dominant or for situations where the required accuracy is very modest. For cloth simulations, diagonally dominant systems generally occur with small time steps, soft materials, and/or large masses. At the other end of the spectrum, the results of the current process are compared to those of an optimized MKL PARDISO solver. As a sparse direct solver, it is attractive if very high accuracy is required or if the problem is very ill-conditioned.

For comparisons, a moderate accuracy (relative error less than $10^{-5}$) and default material parameters that should be representative of typical simulations are used.

The Diag-PCG method is consistently best for small problems, but SA+PPCG is superior for problems with roughly 25 k vertices or more. Somewhat surprisingly, PARDISO shows very good scaling behavior considering that it is a direct solver, but it remains about twice as slow as SA+PPCG. The empirical complexity of SA+PPCG is close to linear in the size of the problem.

The outlier in the above set of results is the dropVertical example. As already seen in FIG. 5 the convergence rate for this problem is worse than for the others, and the time to solution is also longer. The reason for the different behavior in this example is the huge number of cloth repulsion springs added to handle cloth-cloth collisions. While SA+PPCG handles this without any special cases, they do not stem from an underlying and well-behaved PDE so SA+PPCG loses some optimality. However, the same basic scaling behavior is visible as the problem grows larger, and SA+PPCG remains superior to Diag-PCG for large problems.

Hardware Summary

Figure 7:
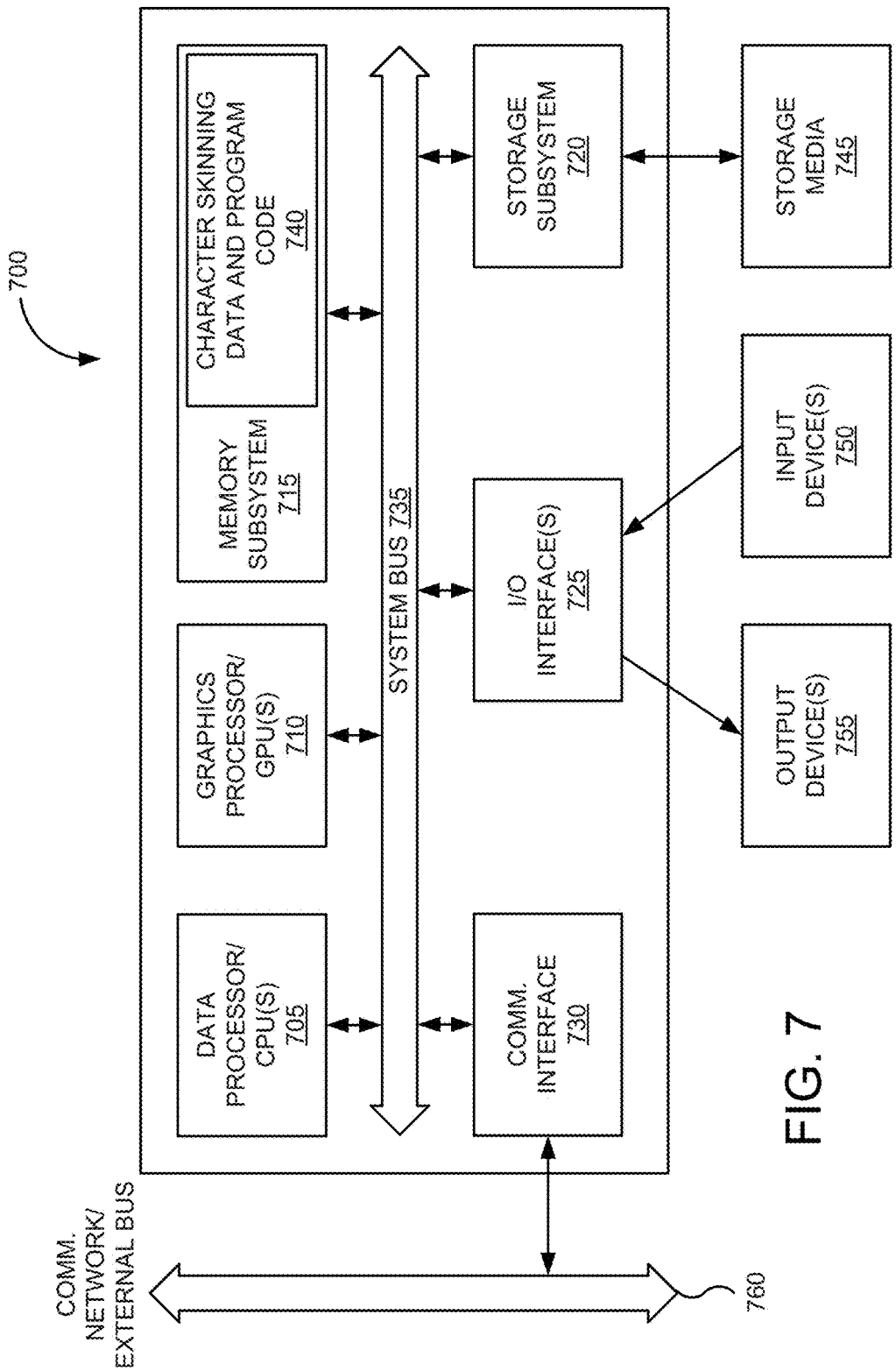
FIG. 7 is a block diagram of a computer system or information processing device that may incorporate an embodiment, be incorporated into an embodiment, or be used to practice any of the innovations, embodiments, and/or examples found within this disclosure.

FIG. 7 is a block diagram of computer system 700 that may incorporate an embodiment, be incorporated into an embodiment, or be used to practice any of the innovations, embodiments, and/or examples found within this disclosure. FIG. 7 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 700 can include hardware and/or software elements configured for performing logic operations and calculations, input/output operations, machine communications, or the like. Computer system 700 may include familiar computer components, such as one or more one or more data processors or central processing units (CPUs) 705, one or more graphics processors or graphical processing units (GPUs) 710, memory subsystem 715, storage subsystem 720, one or more input/output (I/O) interfaces 725, communications interface 730, or the like. Computer system 700 can include system bus 735 interconnecting the above components and providing functionality, such connectivity and inter-device communication. Computer system 700 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 705 can include hardware and/or software elements configured for executing logic or program code or for providing application-specific functionality. Some examples of CPU(s) 705 can include one or more microprocessors (e.g., single core and multi-core) or micro-controllers. CPUs 705 may include 4-bit, 8-bit, 16-bit, 32-bit, 64-bit, or the like architectures with similar or divergent internal and external instruction and data designs. CPUs 705 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 705 may also include one or more field-gate programmable arrays (FPGAs), application-specific integrated circuits (ASICs), or other microcontrollers. The one or more data processors or central processing units (CPUs) 705 may include any number of registers, logic units, arithmetic units, caches, memory interfaces, or the like. The one or more data processors or central processing units (CPUs) 705 may further be integrated, irremovably or moveably, into one or more motherboards or daughter boards.

The one or more graphics processor or graphical processing units (GPUs) 710 can include hardware and/or software elements configured for executing logic or program code associated with graphics or for providing graphics-specific functionality. GPUs 710 may include any conventional graphics processing unit, such as those provided by conventional video cards. Some examples of GPUs are commercially available from NVIDIA, ATI, and other vendors. In various embodiments, GPUs 710 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 710 may include any number of registers, logic units, arithmetic units, caches, memory interfaces, or the like. The one or more data processors or central processing units (CPUs) 705 may further be integrated, irremovably or moveably, into one or more motherboards or daughter boards that include dedicated video memories, frame buffers, or the like.

Memory subsystem 715 can include hardware and/or software elements configured for storing information. Memory subsystem 715 may store information using machine-readable articles, information storage devices, or computer-readable storage media. Some examples of these articles used by memory subsystem 770 can include random access memories (RAM), read-only-memories (ROMS), volatile memories, non-volatile memories, and other semiconductor memories. In various embodiments, memory subsystem 715 can include data and program code 740.

Storage subsystem 720 can include hardware and/or software elements configured for storing information. Storage subsystem 720 may store information using machine-readable articles, information storage devices, or computer-readable storage media. Storage subsystem 720 may store information using storage media 745. Some examples of storage media 745 used by storage subsystem 720 can include floppy disks, hard disks, optical storage media such as CD-ROMS, DVDs and bar codes, removable storage devices, networked storage devices, or the like. In some embodiments, all or part of data and program code 740 may be stored using storage subsystem 720.

In various embodiments, computer system 700 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems.

Computer system 700 may also include one or more applications configured to execute, perform, or otherwise implement techniques disclosed herein. These applications may be embodied as data and program code 740. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 715 and/or storage subsystem 720.

The one or more input/output (I/O) interfaces 725 can include hardware and/or software elements configured for performing I/O operations. One or more input devices 750 and/or one or more output devices 755 may be communicatively coupled to the one or more I/O interfaces 725.

The one or more input devices 750 can include hardware and/or software elements configured for receiving information from one or more sources for computer system 700. Some examples of the one or more input devices 750 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 750 may allow a user of computer system 700 to interact with one or more non-graphical or graphical user interfaces to enter a comment, select objects, icons, text, user interface widgets, or other user interface elements that appear on a monitor/display device via a command, a click of a button, or the like.

The one or more output devices 755 can include hardware and/or software elements configured for outputting information to one or more destinations for computer system 700. Some examples of the one or more output devices 755 can include a printer, a fax, a feedback device for a mouse or joystick, external storage systems, a monitor or other display device, a communications interface appropriately configured as a transceiver, or the like. The one or more output devices 755 may allow a user of computer system 700 to view objects, icons, text, user interface widgets, or other user interface elements.

A display device or monitor may be used with computer system 700 and can include hardware and/or software elements configured for displaying information. Some examples include familiar display devices, such as a television monitor, a cathode ray tube (CRT), a liquid crystal display (LCD), or the like.

Communications interface 730 can include hardware and/or software elements configured for performing communications operations, including sending and receiving data. Some examples of communications interface 730 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 730 may be coupled to communications network/external bus 780, such as a computer network, to a FireWire bus, a USB hub, or the like. In other embodiments, communications interface 730 may be physically integrated as hardware on a motherboard or daughter board of computer system 700, may be implemented as a software program, or the like, or may be implemented as a combination thereof.

In various embodiments, computer system 700 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 700.

As suggested, FIG. 7 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Conclusion

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

REFERENCES

ASCHER, U. M., and BOXERMAN, E. 2003. On the modified conjugate gradient method in cloth simulation. The Visual Computer 19, 7-8, 526-531.

BAKER, A. H., FALGOUT, R. D., KOLEV, T. V. and YANG, U. M. 2011. Multigrid Smoothers for Ultraparallel Computing. SIAM Journal on Scientific Computing 33, 5, 2864-2887.

BARAFF, D., and WITKIN, A. 1998. Large Steps in Cloth Simulation. In Proceedings of the 25th Annual Conference on Computer Graphics and Interactive Techniques, ACM, New York, N.Y., USA, SIGGRAPH '98, 43-54.

BELL, N., DALTON, S., and OLSON, L. 2012. Exposing Fine-Grained Parallelism in Algebraic Multigrid Methods. SIAM Journal on Scientific Computing 34, 4, C123-C152.

BOXERMAN, E., and ASCHER, U. 2004. Decomposing Cloth. In Proceedings of the 2004 ACM SIGGRAPH/Eurographies Symposium on Computer Animation, Eurographics Association, Aire-la-Ville, Switzerland, Switzerland, SCA '04, 153-161.

BRIDSON, R., FEDKIW R., and ANDERSON, J. 2002. Robust Treatment of Collisions, Contact and Friction for Cloth Animation. ACM Trans. Graph. 21, 3 (July), 594-603.

BRIGGS, W., HENSON, V., and MCCORMICK, S. 2000. A Multigrid Tutorial Second Edition. Society for Industrial and Applied Mathematics.

DALTON, S., OLSEN, L, and BELL, N. 2015. Optimizing Sparse Matrix-Matrix Multiplication for the GPU. ACM Transactions on Mathematical Software 41, 4.

FISH, J., PAN, L, BELSKY, V., and GOMAA, S. 1996. Unstructured multigrid methods for shells. International Journal for Numerical Methods in Engineering 39, 7, 1181-1197.

GEE, M. W., and TUMINARO, R. S. 2006. Nonlinear Algebraic Multigrid for Constrained Solid Mechanics Problems Using Trilinos. Tech. Rep. SAND2006-2256, Sandia National Laboratories, April.

GEE, M., RAMM, L. and WALL, W. A. 2005. Parallel multilevel solution of nonlinear shell structures. Computer Methods in Applied Mechanics and Engineering 194, 21-24, 2513-2533. Computational Methods for Shells.

GOLUB, G. H., and LOAN, C. F V. 1983. Matrix Computations, 3rd ed. The John Hopkins University Press.

GOLUB, G. H., and VARGA, R. S. 1961. Chebyshev semi-iterative methods, successive overrelaxation iterative methods, and second order Richardson iterative methods. Numerische Mathematik 3, 1, 157-168.

HARMON, D., VOUGA, E., TAMSTORF R., and GRINSPUN, E. 2008. Robust treatment of simultaneous collisions. ACM Trans. Graph. 27, 3 (August), 23:1-23:4.

HECHT, F., LEE, Y. J., SHEWCHUK, J. R., and O'BRIEN, J. F. 2012. Updated Sparse Cholesky Factors for Corotational Elastodynamics. ACM Transactions on Graphics 31, 5 (October), 123:1-13. Presented at SIGGRAPH 2012.

HORN, R. A., and JOHNSON, C. R. 1985. Matrix Analysis. Cambridge University Press. Cambridge Books Online.

JEON, I., CHOI, K.-J., KIM, T.-Y, CHOI, B.-O., and KO, H.-S. 2013. Constrainable multigrid for cloth. Computer Graphics Forum 32, 7, 31-39.

LEE, Y, YOON, S.-E., OH, S., KIM, D., and CHOI, S. 2010. Multi-resolution cloth simulation. Computer Graphics Form 29, 7, 2225-2232.

MCCORMICK, S. 1984. Multigrid Methods for Variational Problems: Further Results. SIAM Journal on Numerical Analysis 21, 2, 255-263.

MÍKA, S., and VANĚK, P. 1992. Acceleration of convergence of a two-level algebraic algorithm by aggregation in smoothing process. Applications of Mathematics 37, 5, 343-356.

NARAIN, R, SAMII, A., and O'BRIEN, J. F. 2012. Adaptive anisotropic remeshing for cloth simulation. ACM Trans. Graph. 31, 6 (November), 152:1-152:10.

OH, S., NOH, J., and WOHN, K. 2008. A physically faithful multi-grid method for fast cloth simulation. Computer Animation and Virtual Worlds 19, 3-4, 479-192.

OTADUY, M. A., TAMSTORF R., STEINEMANN, D., and GROSS, M. 2009. Implicit Contact Handling for Deformable Objects. Computer Graphics Forum 28, 2, 559-568.

TROTTENBERG, U., OOSTERLEE, C. W., and SCHULLER, A. 2000. Multigrid. Academic press.

VAN DER VORST, H. A. 1982. A Generalized Lanczos Scheme. Mathematics of Computation 39,160 (October), pp. 559-561.

What is claimed is:

1. A method for simulation of deformation of a cloth member, the method comprising:
   receiving at one or more computer systems, information identifying a computer-generated object, wherein the computer-generated object comprises a cloth member;
   receiving information identifying a discretization of the computer-generated object, wherein the discretization comprises a plurality of nodes;
   applying constraints to the discretization, wherein the constrained discretization has the same structure as the unconstrained discretization proximate to the applied constraints;
   receiving information identifying a set of material properties for the computer-generated object; and
   solving for nodes of the discretization via algebraic multigrid, wherein solving for nodes of the discretization comprises solving for nodes of the constrained discretization.

2. The method of claim 1, wherein receiving information identifying the discretization of the computer-generated object comprises generating a matrix, wherein the matrix comprises data relevant to the nodes of the discretization.

3. The method of claim 2, wherein the data relevant to the nodes of the discretization data comprises force data.

4. The method of claim 2, wherein solving for nodes of the constrained discretization comprises iteratively solving for the nodes of the constrained discretization at a plurality of time points via a conjugate gradient method without filtering an output of an iteration of the conjugate gradient method.

5. The method of claim 2, wherein the constraints applied to the discretization are based on predicted collisions, and wherein applying constraints to the discretization comprises pre-filtering of the nodes from the discretization based on predicted collisions by generating a modified matrix.

6. The method of claim 5, wherein the matrix is modified by replacing data relevant to nodes affected by collisions with dummy variables.

7. The method of claim 5, wherein the matrix is modified by operations with an orthogonal projection matrix onto a constraint null space.

8. The method of claim 7, further comprising generating a preconditioner via a preconditioning algorithm, wherein generating a preconditioner via a preconditioning algorithm comprises generating a smoothed aggregation preconditioner.

9. The method of claim 8, wherein generating the smoothed aggregation preconditioner is based on the modified matrix and comprises generating a near-kernel matrix.

10. The method of claim 5, wherein the pre-filtering of the nodes retains the same structure as before pre-filtering.

11. A non-transitory computer-readable medium storing computer-executable code for simulation of deformation of a cloth member, the non-transitory computer-readable medium comprising:
   code for receiving at one or more computer systems, information identifying a computer-generated object, wherein the computer-generated object comprises a cloth member;
   code for receiving information identifying a discretization of the computer-generated object, wherein the discretization comprises a plurality of nodes;
   code for applying constraints to the discretization, wherein the constrained discretization has the same structure as the unconstrained discretization proximate to the applied constraints;
   code for receiving information identifying a set of material properties for the computer-generated object; and
   code for solving for nodes of the discretization via algebraic multigrid, wherein solving for nodes of the discretization comprises solving for nodes of the constrained discretization.

12. The non-transitory computer-readable medium of claim 11, wherein receiving information identifying the discretization of the computer-generated object comprises generating a matrix, wherein the matrix comprises data relevant to the nodes of the discretization.

13. The non-transitory computer-readable medium of claim 12, wherein the constraints applied to the discretization are based on predicted collisions, and wherein applying constraints to the discretization comprises pre-filtering of the nodes from the discretization based on predicted collisions by generating a modified matrix.

14. The non-transitory computer-readable medium of claim 13, wherein the matrix is modified by replacing data relevant to nodes affected by collisions with dummy variables.

15. The non-transitory computer-readable medium of claim 13, wherein the matrix is modified by operations with an orthogonal projection matrix onto a constraint null space.

16. The non-transitory computer-readable medium of claim 15, further comprising code for generating a preconditioner via a preconditioning algorithm, wherein generating a preconditioner via a preconditioning algorithm comprises generating a smoothed aggregation preconditioner.

17. The non-transitory computer-readable medium of claim 16, wherein generating the smoothed aggregation preconditioner is based on the modified matrix and comprises generating a near-kernel matrix.

18. The non-transitory computer-readable medium of claim 13, wherein the pre-filtering of the nodes retains the same structure as before pre-filtering.

* * * * *